United States Patent [19]
Bahoshy et al.

[11] 3,903,305
[45] Sept. 2, 1975

[54] CHEWING GUMS HAVING LONGER LASTING SWEETNESS AND FLAVOR

[75] Inventors: Bernard J. Bahoshy, Mahopac, N.Y.; Charles E. Flynn, Oradell, N.J.; Robert E. Klose, West Nyack, N.Y.

[73] Assignee: General Foods Corporation, White Plains, N.Y.

[22] Filed: Dec. 6, 1973

[21] Appl. No.: 422,453

[52] U.S. Cl. ................................................. 426/3
[51] Int. Cl. ........................... A23g 3/00; A23g 3/30
[58] Field of Search ........................... 426/3, 4, 5, 6

[56] References Cited
UNITED STATES PATENTS

| | | |
|---|---|---|
| 2,631,119 | 3/1953 | Ferguson ............................... 426/3 |
| 2,886,441 | 5/1959 | Kramer ................................... 426/5 |
| 3,352,689 | 11/1967 | Bilotti ..................................... 426/3 |
| 3,655,866 | 4/1972 | Bilotti ..................................... 426/3 |
| 3,681,087 | 8/1972 | Johnson ................................. 426/3 |
| 3,795,744 | 3/1974 | Ogawa ................................... 426/3 |

Primary Examiner—A. Louis Monacell
Assistant Examiner—J. M. Hunter
Attorney, Agent, or Firm—Bruno P. Struzzi; Daniel J. Donovan; Doris M. Bennett

[57] ABSTRACT

Chewing gums of longer lasting sweetness and flavor are prepared from compositions comprising a gum base, sweeteners, flavors and an effective amount of a mixture of monosodium glutamate and a material selected from the group consisting of saccharin, cyclamate, and mixtures thereof, said mixture being fixed in gelatin.

15 Claims, No Drawings

CHEWING GUMS HAVING LONGER LASTING SWEETNESS AND FLAVOR

BACKGROUND OF THE INVENTION

This invention relates to chewing gums and more particularly to flavored chewing gums with a longer lasting sweetness and flavor.

Chewing gums generally comprise a chewable gum base such as chicle, its substitutes, mixtures thereof, and the like. Incorporated within this gum base may be plasticizers or softeners to improve the consistency and texture of the gum, flavors, and sweetening agents such as sugar or corn syrup or, for sugarless gums, artificial sweeteners.

It is found that one of the limitations of currently available chewing gums is their rapid loss of both flavor and sweetness occurring after about 3 to 5 minutes of chewing. Attempts at obviating this problem have been directed towards delaying the initial flavor release but such attempts have generally been hampered both by their lack of flavor up to the time of release, and by their excessively strong flavor impact at the time of release.

It is accordingly an object of this invention to produce flavored chewing gums of substantially longer lasting, sustained sweetness and flavor than currently available products.

This and other objects will become apparent upon reading the specification and claims which follow.

SUMMARY OF THE INVENTION

It has been found in accordance with this invention that a flavored chewing gum of longer lasting sweetness and flavor may be prepared through the addition of an effective amount of a mixture of monosodium glutamate and a material selected from the group consisting of saccharin, cyclamate and mixtures thereof, fixed in gelatin to the gum product. This invention is applicable to both sugarless and sugar-containing chewing gums and gums prepared from the compositions of this invention have been found to exhibit a sweetness and flavor extension of up to three minutes and greater over commercially available products.

DETAILED DESCRIPTION OF THE INVENTION

The chewing gums of this invention comprise a gum base, sweeteners, flavors, and an effective amount of a mixture of monosodium glutamate and a material selected from the group consisting of saccharin, cyclamate and mixtures thereof, fixed in gelatin.

The gum base may be any chewable, substantially water insoluble base such as chicle and substitutes thereof, guttakay, sorva, jelutong, synthetic polymers such as polyvinyl acetate, synthetic resins, rubbers, and the like, and mixtures of these materials. The amount of gum base employed may vary widely depending upon the type base used, the other ingredients making up the final gum product, and other like factors. Generally, however, it has been found that anywhere from about 15 to about 40 percent by weight of the final gum composition may be used, and preferably from about 20 to about 30 percent. Plasticizers or softeners such as lanalin, propylene glycol, glycerol, and the like, and mixtures thereof may optionally be incorporated within the gum base to achieve a desired texture and consistency.

Generally, the flavors employed in flavored chewing gums may be the essential oils or synthetic flavors or mixtures of these. Flavors such as wintergreen, spearmint, peppermint, birch, anise, fruit flavors, and the like may be used satisfactorily with a variety of gum bases. The amount of flavoring material is normally a matter of preference but may be subject to the consideration of such factors as the type flavor used, the type base used, and the like.

The remaining portion of the gum composition is generally a sweetening agent such as sugar or, for sugarless gums, a sugar substitute. By sugar we mean sucrose, dextrose, corn syrup solids, and the like, and mixtures thereof. Sugar substitutes may be any artificial sweetening agent normally used in sugarless chewing gums such as mannitol, sorbitol, saccharin, cyclamate, dipeptide sweeteners such as L-aspartyl-L-phenylalanine methyl ester, and those described in U.S. Pat. No. 3,492,131, issued Jan. 27, 1970, and the like, or mixtures of these.

The loss of flavor impact and sweetness in a flavored chewing gum generally occurs after about 3 to 5 minutes of chewing. It has been found that the addition to the gum composition of a mixture of monosodium glutamate and a material selected from the group consisting of saccharin, cyclamate, and mixtures thereof fixed in gelatin, is effective in extending the time period over which both sweetness and flavor are discernible. The term "fixed in gelatin, as used herein, means uniformly distributing the flavor and sweetness extending materials in a gelatin solution and then drying the resultant solution. It should be obvious, of course, that both the components of the mixture may be fixed independently and then combined or mixed together and then fixed.

Gelatin fixation of the material may be achieved through a wide variety of processing methods. These methods may include freeze drying a mixture of gelatin and the material to be fixed, spray-drying, drum drying, slab drying, oven drying, tray drying, pan drying, or other well-known drying techniques. Gelatin fixation may also be achieved through the use of other physical techniques such as coacervation, and other like methods.

The gelatin which may be employed in the practice of this invention may be any of the grades and types of gelatin, including those obtained from tanner's stock, pigskin, and the like. The Bloom of the gelatin used is not critical and may vary widely, that is, anywhere from about 50 or less to as high as about 250.

The amount of gelatin used in fixing either the individual components, or their mixture may vary widely subject to the necessity of using enough to effectively fix the particles and the undesirability of using excessive amounts of gelatin which may adversely effect the texture of the finished gum product. Generally, it is found that within a gelatin-fixed particle or particles the amount of material to be fixed may be anywhere from about 10 percent by weight of the gelatin to about 100 percent by weight of the gelatin without adversely effecting the gum product.

The preparation of the chewing gums of this invention is achieved through more or less conventional methods including a softening of the gum base through mixing, addition of sweetener to the base, addition of the flavor extending particles to the mixture, followed by addition of the flavoring materials and formation of the gum into suitable forms such as sticks.

Where saccharin is employed, the total amount of the saccharin and monosodium glutamate mixture effective to achieve a significant flavor and sweetness extension in a chewing gum product is preferably between about 0.1 and about 1.5 percent, percents by weight of the final gum composition. The ratio of the two components may vary widely over the lower range of the preferred level of use of the mixture. When higher levels of the mixture are employed it is preferred to mix the two components such that the amount of saccharin does not exceed 0.5 percent by weight of the final gum composition. Use of saccharin above this level, while resulting in a flavor and sweetness extension, has been found to impart somewhat bitter after-taste to the gum product which may be undesirable according to one's preference. Preferably, the mixture should contain anywhere from about 0.05 to about 1.0 percent of monosodium glutamate and about 0.05 to 0.5 percent of saccharin, percents by weight of the final gum composition. It is preferred to employ equal amounts of each component in the final product.

Where cyclamate is employed, the total amount of the cyclamate and monosodium glutamate mixture effective to achieve a significant flavor and sweetness extension in a chewing gum product is preferably between about 0.1 and about 2.0 percent, percents by weight of the final gum composition. The ratio of the two components may vary widely over the lower range of the preferred level of use of the mixture. When higher levels of the mixture are employed it is preferred to mix the two components such that the amount of cyclamate does not exceed about 1.0 percent by weight of the final gum composition. Use of cyclamate above this level, while resulting in a flavor and sweetness extension, may be found to impart a somewhat better after-taste to the gum product which may be undesirable according to one's preference. Preferably, then, the mixture should contain anywhere from about 0.05 to about 1.0 percent of monosodium glutamate and about 0.05 percent, preferably 0.1 to 1.0 percent of cyclamate, percents by weight of the final gum composition. It is preferred to employ equal amounts of each component in the final product.

As used in the context of this invention saccharin and cyclamate are intended to also embrace the physiologically acceptable salts thereof such as the sodium or calcium salts.

The monosodium glutamate, of course, may be mixed with any combination of the materials within the ranges set forth above.

The best mode of our invention employs a mixture of monosodium glutamate and saccharin and is set forth and further illustrated by the following examples. As indicated in these examples there is some synergistic or potentiation effect from the fixed monosodium glutamate/fixed saccharin combination thus making possible the achievement of significant flavor and sweetness extensions without the need for high levels of saccharin which may lead to a troublesome after-taste being imparted to the chewing gum.

In order to measure the flavor and sweetness duration in a chewing gum, taste tests were conducted using trained personnel to evaluate the time versus intensity of flavor and sweetness. Panel members are given a stick of gum and asked to chew and record their values for flavor intensity at thirty second intervals. Comparisons of experimental gum samples are made against a sample of a control gum formulation and the time versus intensity values are used to assign a "flavor duration" value to each sample. For the purposes of the testing, flavor duration is defined as the chewing time in minutes for the gum flavor to become just barely detectable. Thus, flavor extension is the difference between the flavor duration of the control and the experimental sample.

EXAMPLE I

In order to evaluate the flavor and sweetness extension obtained through the use of the gelatin-fixed monosodium glutamate, gum samples were prepared from the following ingredients:

| Ingredient | 1 | 2 | 3 | 4 | 5 | 6 | 7 |
|---|---|---|---|---|---|---|---|
| | | | | % by weight Composition | | | |
| Chewing Gum Base | 23.993 | 23.993 | 23.993 | 23.993 | 23.993 | 23.993 | 23.993 |
| Sugar | 58.937 | 58.737 | 58.737 | 58.737 | 58.088 | 57.088 | 57.088 |
| Corn Syrup, 46° | 14.245 | 14.245 | 14.245 | 14.245 | 14.245 | 14.245 | 14.245 |
| Glycerol | 0.749 | 0.749 | 0.749 | 0.749 | 0.749 | 0.749 | 0.749 |
| Flavor | 1.276 | 1.276 | 1.276 | 1.276 | 1.276 | 1.276 | 1.276 |
| Gelatin | 0.800 | 0.800 | | 0.800 | | 2.249 | |
| Monosodium Glutamate (MSG) | | 0.200 | | | | 0.200 | |
| Gelatin-fixed MSG (20% MSG) | | | 1.000 | | | | 1.000 |
| Saccharin | | | | 0.200 | 0.200 | | |
| Gelatin-Fixed Saccharin (12% Saccharin) | | | | | 1.649 | | 1.649 |

Gelatin fixation was achieved through slab-drying techniques. For Sample 3, 160 grams of gelatin were mixed with 40 grams of monosodium glutamate. The mixture was stirred into 800 ml of water, heated to solution, and poured into a tray in a layer of about three-sixteenths of an inch. The solution was cooled to about 40°F to 50°F to form a firm gel which was cut into squares, dried at 100°F in a forced air oven, and ground for use in the gum formulation.

For the gum preparation, the gum base was softened for 10 minutes at 150°F in a mixer, the glycerol added and mixed for 10 minutes, and the corn syrup added as mixing continued for ten minutes. The appropriate amount of MSG or saccharin or their mixture was blended with the sugar and added to the mixer in two portions with ten minutes mixing after each addition. The flavor was then added, the gum was removed from the mixer, and then rolled and scored into sticks.

EXAMPLE II

The chewing gums prepared in Example I were evaluated by a taste-panel for time versus intensity values from which a flavor duration value for each sample was obtained.

| Sample No. | Description | Flavor Duration (Min.) |
|---|---|---|
| 1 | Control | 5.5 |
| 2 | Unfixed MSG (0.2%) | 5.5 |
| 3 | Fixed MSG (0.2%) | 6.5 |
| 4 | Unfixed Saccharin (0.2%) | 6.0 |
| 5 | Fixed Saccharin (0.2%) | 6.0 |
| 6 | Unfixed MSG(0.2%)+Unfixed Saccharin (0.2%) | 6.5 |
| 7 | Fixed MSG(0.2%)+Fixed Saccharin (0.2%) | 8.0 |

It can be seen from the above values that the fixed MSG and fixed saccharin mixture extend the flavor in Sample 7 about 2.5 minutes over the control sample. This result is surprising in that the independent use of each fixed component results in an extension of only about one minute over the control sample. This synergistic effect makes possible the preparation of a chewing gum having a significant flavor extension over currently available products without having to use excessive quantities of each individual material.

EXAMPLE III

Sugarless chewing gums are prepared according to Example I from the following ingredients:

| Ingredient | % Composition by Weight |
|---|---|
| Sorbitol | 49.75 |
| Gum Base | 34.9 |
| Mannitol | 8.1 |
| Glycerol | 2.8 |
| Water | 1.4 |
| Flavor | 1.1 |
| Saccharin | 0.2 |
| Gelatin | |
| Fixed MSG (20% MSG) | 1.50 |
| Fixed Saccharin (20% saccharin) | 0.25 |

The fixed saccharin may be replaced by 0.25 percent of 50 percent fixed cyclamate.

While the above invention has been described with reference to the above examples of our best mode of practicing this invention, they are intended to be merely illustrative of the many and varied embodiments of the invention. Obvious variations in the ingredients used, their level of addition, and other like modifications are believed to be within the scope of this invention.

We claim:

1. A chewing gum composition consisting essentially of a gum base, sweetener, flavor, and a mixture of monosodium glutamate and a material selected from the group consisting of saccharin, cyclamate and mixtures thereof, said mixture being fixed in gelatin and present in an amount effective to produce a longer lasting sweetness and flavor in said chewing gum.

2. The chewing gum of claim 1 wherein said material is saccharin.

3. The chewing gum of claim 2 wherein said monosodium glutamate and said saccharin are independently fixed in gelatin.

4. The chewing gum of claim 2 wherein said monosodium glutamate and said saccharin are mixed prior to fixing in gelatin.

5. The chewing gum of claim 2 wherein said sweetener is sugar.

6. The chewing gum of claim 2 wherein said sweetener is a sugar substitute.

7. The chewing gum of claim 2 wherein said mixture comprises from about 0.05 to about 0.5 percent of said saccharin and from about 0.05 to about 1.0 percent of said monosodium glutamate, percent by weight of the final gum composition.

8. The chewing gum of claim 7 wherein said mixture is fixed in an amount of gelatin at least equal in weight to the weight of said mixture.

9. The chewing gum of claim 8 wherein said saccharin and said monosodium glutamate are present as equal weight proportions in said mixture.

10. The chewing gum of claim 9 wherein said mixture is fixed in gelatin by means of slab fixation.

11. The chewing gum of claim 1 wherein said material is cyclamate.

12. The chewing gum of claim 11 wherein said mixture comprises from about 0.05 to about 1.0 percent of said cyclamate and from about 0.05 to about 1.0 percent of said monosodium glutamate, percents by weight of the final gum composition.

13. The chewing gum of claim 12 wherein said monosodium glutamate and said cyclamate are independently fixed in gelatin.

14. The chewing gum of claim 12 wherein said sweetener is sugar.

15. The chewing gum of claim 12 wherein said sweetener is a sugar substitute.

* * * * *